US012803660B2

(12) United States Patent
Lever

(10) Patent No.: US 12,803,660 B2
(45) Date of Patent: Nov. 17, 2026

(54) SATELLITE COMMUNICATION TERMINAL FOR IoT APPLICATIONS

(71) Applicant: Gilat Satellite Networks Ltd., Petah Tikva (IL)

(72) Inventor: Dubi Lever, Hashmonaim (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 1019 days.

(21) Appl. No.: 17/854,935

(22) Filed: Jun. 30, 2022

(65) Prior Publication Data

US 2023/0010606 A1 Jan. 12, 2023

Related U.S. Application Data

(60) Provisional application No. 63/220,846, filed on Jul. 12, 2021.

(51) Int. Cl.

| | |
|---|---|
| ***H04B 7/185*** | (2006.01) |
| ***H04B 7/08*** | (2006.01) |
| ***H04B 7/195*** | (2006.01) |
| ***H04B 10/29*** | (2013.01) |
| ***H04L 7/00*** | (2006.01) |

(52) U.S. Cl.

CPC ......... *H04B 7/195* (2013.01); *H04B 7/18513* (2013.01); *H04B 7/18519* (2013.01); *H04B 7/18528* (2013.01)

(58) Field of Classification Search

None

See application file for complete search history.

(56) References Cited

U.S. PATENT DOCUMENTS

| | | | | |
|---|---|---|---|---|
| 10,206,161 | B2 * | 2/2019 | Whelan | H04B 7/18504 |
| 2017/0041830 | A1 * | 2/2017 | Davis | H04B 7/1851 |
| 2018/0376393 | A1 * | 12/2018 | Wu | H04B 7/18521 |
| 2019/0036603 | A1 * | 1/2019 | De Mos | H04L 7/0075 |
| 2019/0089623 | A1 * | 3/2019 | Dion | H04L 47/2408 |
| 2019/0364584 | A1 * | 11/2019 | Johnson | H04L 47/2483 |
| 2021/0184764 | A1 * | 6/2021 | Metzger | H04B 7/18521 |
| 2022/0271824 | A1 * | 8/2022 | Blumenthal | H04B 7/0691 |

OTHER PUBLICATIONS

Siris Vasilios A et al: "Supporting the IoT over Integrated Satellite-Terrestrial Networks Using Information-Centric Networking" 2016 8th IFIP International Conference on New Technologies, Mobility and Security (NTMS), IEEE, Nov. 21, 2016 (Nov. 21, 2016), pp. 1-5, XP033034838.

(Continued)

*Primary Examiner* — Pablo N Tran
(74) *Attorney, Agent, or Firm* — Banner & Witcoff, Ltd.

(57) ABSTRACT

A method for satellite communication over non-geosynchronous orbit (NGSO) satellites, using a terminal having a non-tracking antenna, is presented. The terminal may communicate with an NGSO satellite each time the NGSO satellite passes through the terminal's antenna beam (communication opportunity). Though the communication opportunities are short and may reoccur at relatively long intervals (e.g., minutes to tens of minutes), these communication opportunities may be sufficient for transmitting the volumes of information generated by Internet of Things (IoT) applications during the intervals between communication opportunities.

20 Claims, 1 Drawing Sheet

(56) References Cited

OTHER PUBLICATIONS

Rahim S N M et al: “Design of Space-based IoT System on Multiple Access Communication for Nanosatellite Applications”, Journal of Physics: Conference Series, Institute of Physics Publishing, Bristol, GB, vol. 1768, No. 1, Feb. 10, 2021 (Feb. 10, 2021), p. 12012, XP020362400.

Enche Ab Rahim Siti Amalina et al: “Evaluation of Ground Sensor Terminal (GST) Transceiver System for UiTMSAT-1 Store & Forward Mission”, 2019 6th International Conference on Space Science and Communication (ICONSPACE), IEEE, Jul. 28, 2019 (Jul. 28, 2019), pp. 73-76, XP033680798.

Anandan V K et al: “Multiple Satellite Telemetry and Tracking System (MuST)”, 2018 IEEE Indian Conference on Antennas and Propogation (INCAP), IEEE, Dec. 16, 2018 (Dec. 16, 2018), XP033581141.

Nov. 30, 2022—EP Search Report—EP App. No. 22183661.2.

* cited by examiner

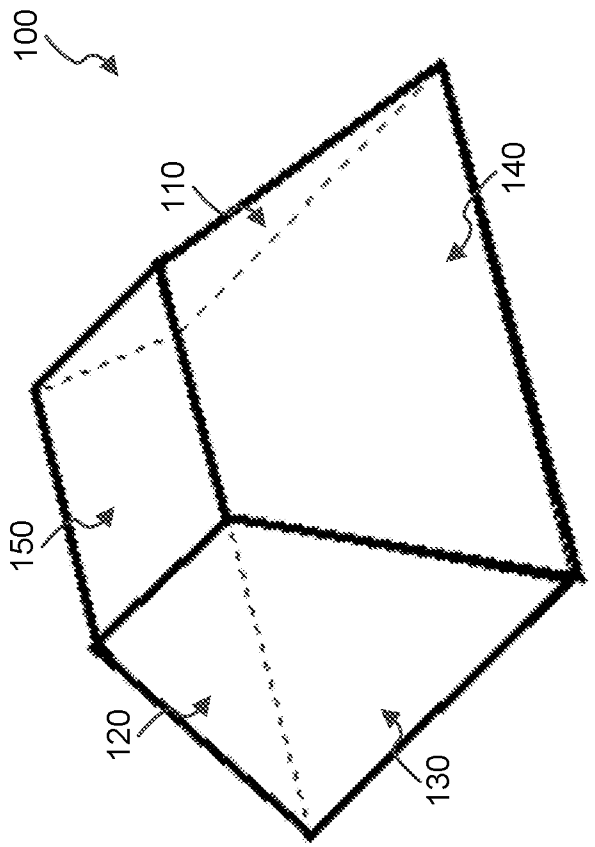
100
110
140
150
120
130

SATELLITE COMMUNICATION TERMINAL FOR IoT APPLICATIONS

CROSS-REFERENCE TO RELATED APPLICATION

This application claims the benefit of U.S. Provisional Application No. 63/220,846, filed on Jul. 12, 2021. The above-referenced application is hereby incorporated by reference in its entirety.

FIELD OF THE INVENTION

Aspects of the disclosure pertain to the field of satellite communications in general, and to satellite communication over Non-Geosynchronous Orbit (NGSO) satellite constellations.

BACKGROUND

The Internet of Things (IoT) technology addresses a wide range of applications. Monitoring of various sensors (e.g., for agricultural applications, utilities, asset tracking, etc.) is one type of such applications. Monitoring a sensor includes sending information from the sensor to an information collector (which may at least store the information for further processing). In such monitoring applications, the sensor (usually infrequently) sends small volumes of information (e.g. a few kilobits every few minutes). Considering a potentially high number of sensors and the relatively low cost of the sensing equipment, for such applications to be cost-effective the cost of connectivity (e.g., between the sensors and the information collector) should be low. For this reason, existing solutions operative over Geosynchronous (GEO) satellites consist of relatively low-cost L-Band terminals suitable for low data rate communication.

The intervals between (consecutive) information sending events (e.g., by sensors) have recently led to promoting use of small Low Earth Orbit (LEO) satellites (e.g., cubesats or nano-satellites) for such IoT applications. A LEO satellite does not provide continuous coverage of any part of the Earth's surface, so a satellite communication terminal connected to the sensor(s) may establish a communication link via the LEO satellite only when the satellite comes into the terminal's field of view (e.g., when the antenna scan angle is 70 degrees or less). At that time, the terminal may upload the sensor(s) information to the LEO satellite, where it may be stored and then downloaded to a gateway station when the LEO satellite enters the field of view of the gateway. However, recently envisaged Non-Geosynchronous (NGSO) satellite communication constellations, such as ONEWEB, STARLINK, LIGHTSPEED KUIPER and MPOWER (all designed to operate either in Ku-band or in Ka-band), may seem unsuitable for such IoT applications, since their terminals include expensive tracking antennas, which are likely to render any IoT application solution cost ineffective.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below.

In an aspect of the disclosure, a terminal configured for satellite communication may be presented. In some embodiments, the terminal may be configured to operate over an NGSO satellite constellation and may be usable for IoT applications. In some embodiments, the terminal may comprise at least a modem and a fixed non-tracking antenna that may be coupled to the modem. The modem may be configured to collect information from one or more (IoT) applications and store the information, for example until the information could be transmitted to a satellite. The modem may be further configured to continuously operate in an acquisition mode and to pick up a signal that may be transmitted from a satellite of the NGSO constellation of satellites. Upon receiving the signal from the satellite, the modem may be configured to upload the stored information to the satellite.

BRIEF DESCRIPTION OF THE DRAWINGS

Having thus described the disclosure in general terms, reference will now be made to the accompanying drawings, which are not necessarily drawn to scale, and wherein:

FIG. 1 shows a frustum antenna in accordance with aspects of the disclosure.

DETAILED DESCRIPTION

Satellites of NGSO satellite constellations may be in motion relative to terminals that may be located on the Earth's surface. For example, assuming LEO satellites in a single orbital plane and considering a maximum scan angle of 70 degrees (e.g., a minimum elevation angle of 20 degrees), a LEO satellite may cross a terminal's field of view within about 10 minutes (e.g., the satellite pass duration may be about 10 minutes long). In another example, considering a maximum scan angle of 70 degrees, a MEO satellite (e.g., orbiting the Earth at an altitude of about 8000 kilometers) may cross a terminal's field of view within about 40 minutes (e.g., the satellite pass duration may be about 40 minutes long).

Considering an IoT application comprising at least the monitoring of one or more sensors, wherein the application may infrequently generate small volumes of information. Depending on the volumes of information and on a transmission rate, a modem of a terminal configured for satellite communication may need only few seconds for establishing a link with a satellite and uploading the sensor(s) information to the satellite.

Considering the two statements above, a possible conclusion is that servicing IoT applications over an NGSO satellite constellation (using a terminal configured for satellite communication) may be possible even if the terminal may be unable to track an NGSO satellite as it passes across the terminal's field of view. If the terminal could briefly communicate with the NGSO satellite, at least once every pass of the satellite, it may be enough for the IoT application to function properly. Thus, a terminal configured for satellite communication that may be servicing IoT applications may be equipped with a non-tracking antenna that is much less expensive than a tracking antenna. As the terminal becomes less expensive, servicing IoT applications over NGSO satellites may become cost effective.

According to aspects of the disclosure, a terminal may be configured for satellite communication. In some embodiments, the terminal may comprise at least a modem and a stationary, non-tracking antenna that may be coupled to the modem. The antenna may be configured to transmit signals to a satellite and to receive signals from the satellite using one or more frequency bands (e.g. Ka-band, Ku-band, etc.).

The terminal may be configured to operate over an NGSO satellite constellation. In some embodiments, the NGSO satellite constellation may comprise one or more LEO satellites that may orbit the Earth in one or more orbital planes. In some embodiments, the NGSO satellite constellation may comprise one or more MEO satellites that may orbit the Earth in one or more orbital planes. In some embodiments, the NGSO satellite constellation may comprise a plurality of satellites orbiting the Earth at multiple altitudes.

The aperture size of the antenna of the terminal may be determined based on a tradeoff between two contradicting requirements. On one hand, the antenna aperture may need to be quite small in order for it to have a relatively wide beam (as antenna beam width is reversely proportionate to its aperture size), so that the (moving) NGSO satellite may be within the terminal's antenna beam for an interval that may be sufficient for establishing a link between the terminal and the NGSO satellite and uploading the sensor(s) information to the satellite. On the other hand, the antenna aperture may need to be large enough to provide sufficient gain (as antenna gain is proportionate to its aperture size), so that the link between the terminal and the NGSO satellite may support sufficient data rate for uploading the sensor(s) information during the (short) interval that the link may be established and ready for uploading the information.

As mentioned above, the antenna of the terminal may be a stationary, non-tracking antenna, since such an antenna may be much less expensive than any non-stationary and/or tracking antenna. For example, the antenna of the terminal may be a parabolic antenna or a panel antenna, wherein in these examples the antenna may comprise a single aperture. With the antenna having a single, non-tracking aperture, the terminal may be able to establish a link with a single satellite at a time and only once during the satellite pass duration. For example, in case of a LEO satellite constellation, the terminal may have a communication opportunity (e.g. be able to establish a link) with a LEO satellite at least once every about 10 minutes (e.g. assuming a single orbital plane). The interval between communication opportunities may depend on any of the terminal's latitude and a number of orbital planes of the LEO satellite constellation visible to the terminal's antenna. In another example, in case of a MEO satellite constellation, the terminal may have a communication opportunity with a MEO satellite once every about 40 minutes. In some cases, a 40 minute interval between communication opportunities may be too long of an interval.

According to aspects of the disclosure, the terminal may comprise a frustum structured antenna 100, e.g., as shown in FIG. 1, for at least the purpose of shortening an interval between consecutive communication opportunities.

In some embodiments, antenna 100 may comprise multiple antenna panels, wherein each antenna panel may be configured as a receive and transmit aperture, and wherein an antenna panel may be mounted on each side-face of the frustum (e.g., on sides 110, 120, 130 and 140). In some embodiments, antenna 100 may further comprise an additional antenna panel that may be mounted on the top face (150) of the frustum.

Having multiple apertures, antenna 100 may facilitate multiple communication opportunities during a single satellite pass. Thus, compared to using a single aperture antenna, by using antenna 100 the interval between communication opportunities may be shorter. In another example, where the NGSO constellation may be a MEO constellation, an antenna 100 with 4 antenna panels (e.g. 110, 120, 130 and 140) may facilitate a simplified terminal installation that may not require aligning antenna 100 in accordance with an orbital plane of the MEO constellation. In yet another example, where the NGSO constellation may be a MEO constellation, if terminal installation includes aligning antenna 100 in accordance with an orbital plane of the MEO constellation, antenna 100 may comprise only 2 antenna panels (e.g. 110 and 130, or 120 and 140), for at least the purpose of reducing the antenna cost. In a further example, where the NGSO constellation may be a LEO constellation, using an antenna 100 with either 4 or 5 antenna panels may enable continued operation of the terminal over time, even though one or more orbital planes of the LEO constellation may be drifting across the sky.

According to aspects of the disclosure, the modem of the terminal may be configured to continuously listen for a signal (e.g. operate in acquisition mode), wherein the signal may be transmitted from an NGSO satellite. The modem may be configured to listen for a signal for at least the purpose of determining a communication opportunity with the NGSO satellite. In some embodiments, the signal may comprise a beacon signal of the NGSO satellite. In some embodiments, the signal may comprise a relayed version of a signal generated by an earth station other than the terminal. In some embodiments, wherein the antenna of the terminal may comprise multiple apertures, the modem may be configured to scan through the multiple apertures at short intervals, for example, listening via each aperture for up to 100 milliseconds at a time before switching to a next aperture. Said scanning may enable detecting the signal from the NGSO satellite whenever the signal from the NGSO satellite could be received via any of the apertures. The modem may be configured to, while listening for a signal from an NGSO satellite, receive (e.g., from at least one device that may be connected to the modem via at least one communication interface, for example an Ethernet LAN interface) information associated with one or more applications (e.g., comprising one or more information items), and to store the information in a memory of the modem. In some embodiments, at least one of the one or more applications may be an IoT application. In some embodiments, the IoT application may be a sensor monitoring application.

The modem may be configured to, upon receiving a signal from an NGSO satellite, to establish a data link with the NGSO satellite (e.g. through exchange of control messages in accordance with a predefined protocol), wherein said establishing may take as little time as possible, for at least the purpose of having most of the communication opportunity interval available for application information upload. The modem may be configured to, once the data link is established, determine that one or more application information items may be stored in the modem's memory, transmit at least one of the one or more application information items to the NGSO satellite, and erase the at least one application information item from the modem's memory. In some embodiments, the modem may be configured to erase the at least one application information item from its memory after (and/or in response to) receiving acknowledgement from the NGSO satellite that the at least one application information item has been correctly received at the NGSO satellite.

A terminal may receive, via a first communication interface, information from one or more devices. The terminal may receive, via a second communication interface different from the first communication interface, a signal from a non-geosynchronous orbit (NGSO) satellite, and responsive to the receiving the signal (e.g., a beacon signal of the NGSO satellite or a relayed version of a signal generated by an earth station other than the terminal) from the NGSO satellite, transmit to the NGSO satellite, at least part of the information. The one or more devices may be connected to a modem of the terminal via the first communication interface, wherein the first communication interface may comprise an Ethernet LAN interface. The second communication interface may comprise an antenna coupled to the terminal and the antenna may comprise a plurality of antenna panels forming a frustum, wherein each antenna panel is configured as a transceiver aperture to communicate with the NGSO satellite.

The terminal may store, in a memory of the terminal, the information, wherein the information is associated with one or more applications. After the receiving the signal from the NGSO satellite and before the transmitting, the terminal may establish a data link with the NGSO satellite, wherein the transmitting the at least part of the information to the NGSO satellite is via the data link. The terminal may listen, via the second communication interface, for the signal from the NGSO satellite, wherein the second communication interface comprises an antenna coupled to the terminal (e.g., a non-tracking antenna), the antenna may comprise multiple apertures, and the listening may comprise scanning through the multiple apertures. The scanning through the multiple apertures may comprise listening for the signal from the NGSO satellite through each aperture of the multiple apertures for a predetermined period (e.g., 100 milliseconds). The information from one or more devices (e.g., sensors, Internet of Things (IoT) devices) may be associated with one or more Internet of Things (IoT) applications and/or one or more sensor monitoring applications. The terminal may receive, from the NGSO satellite, an acknowledgement that the at least part of the information has been correctly received by the NGSO satellite, and after the receiving the acknowledgement, may erase the at least part of the information from a memory of the terminal.

A terminal may receive, via a first communication interface, data from one or more devices, wherein the data may be associated with one or more sensor monitoring applications. The terminal may receive, via a second communication interface different from the first communication interface, a signal from a satellite wherein the satellite may be associated with a non-geosynchronous orbit (NGSO) constellation of satellites. The second communication interface may comprise an antenna coupled to the terminal and the antenna comprises a plurality of side-faces in a shape of a frustum, wherein at least two of the plurality of side-faces are configured to transmit to or receive from the satellite during a single pass of the satellite orbiting the Earth. Responsive to the receiving the signal from the satellite, the terminal may transmit to the satellite, at least part of the data.

A terminal may receive, via a first communication interface, information associated with one or more applications, wherein at least one of the one or more applications may comprise an Internet of Things (IoT) application. The terminal may receive, via a second communication interface different from the first communication interface, a signal from a non-geosynchronous orbit (NGSO) satellite, wherein the second communication interface may comprise an antenna coupled to the terminal and the antenna may comprise a plurality of antenna panels, wherein at least a pair of the plurality of antenna panels are configured to bidirectionally communicate with the NGSO satellite. Responsive to the receiving the signal, the terminal may transmit to the NGSO satellite, at least part of the information associated with the one or more applications.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. A method comprising receiving, by a terminal and via a first communication interface, information associated with one or more applications.

Clause 2. The method of clause 1, further comprising receiving, by the terminal and via a second communication interface different from the first communication interface, a signal from a non-geosynchronous orbit (NGSO) satellite.

Clause 3. The method of any one of clauses 1 or 2, further comprising, responsive to the receiving the signal from the NGSO satellite, transmitting, by the terminal and to the NGSO satellite, at least part of the information.

Clause 4. The method of any one of clauses 1-3, further comprising storing, in a memory of the terminal, the information.

Clause 5. The method of any one of clauses 1-4, further comprising listening, by the terminal and via the second communication interface, for the signal from the NGSO satellite.

Clause 6. The method of any one of clauses 1-5, wherein: the second communication interface comprises an antenna coupled to the terminal, the antenna comprises multiple apertures, and the listening comprises scanning through the multiple apertures.

Clause 7. The method of any one of clauses 1-6, wherein the second communication interface comprises an antenna coupled to the terminal and the antenna comprises a non-tracking antenna.

Clause 8. The method of any one of clauses 1-7, further comprising receiving, by the terminal and from the NGSO satellite, an acknowledgement that the at least part of the information has been correctly received by the NGSO satellite.

Clause 9. The method of any one of clauses 1-8, further comprising, after the receiving the acknowledgement, erasing the at least part of the information from a memory of the terminal.

Clause 10. The method of any one of clauses 1-9, wherein the second communication interface comprises an antenna coupled to the terminal and the antenna comprises a plurality of antenna panels forming a frustum.

Clause 11. The method of any one of clauses 1-10, wherein each antenna panel is configured as a transceiver aperture to communicate with the NGSO satellite.

Clause 12. The method of any one of clauses 1-11, wherein the information is associated with one or more Internet of Things (IoT) applications.

Clause 13. The method of any one of clauses 1-11, wherein the information is associated with one or more sensor monitoring applications.

Clause 14. A method comprising receiving, by a terminal and via a first communication interface, data from one or more applications.

Clause 15. The method of clause 14, further comprising receiving, by the terminal and via a second communication interface different from the first communication interface, a signal from a satellite.

Clause 16. The method of any one of clauses 14 or 15, further comprising, responsive to the receiving the signal from the satellite, transmitting, by the terminal and to the satellite, at least part of the data.

Clause 17. The method of any one of clauses 14-16, wherein the satellite is associated with a non-geosynchronous orbit (NGSO) constellation of satellites.

Clause 18. The method of any one of clauses 14-17, wherein the second communication interface comprises an antenna coupled to the terminal and the antenna comprises a plurality of side-faces in a shape of a frustum.

Clause 19. The method of any one of clauses 14-18, wherein at least two of the plurality of side-faces are configured to transmit to or receive from the satellite during a single pass of the satellite orbiting the Earth.

Clause 20. The method of any one of clauses 14-19, wherein the data is associated with one or more sensor monitoring applications.

Clause 21. A computing device comprising one or more processors; and memory storing instructions that, when executed by the one or more processors, cause the computing device to perform:

the method of any one of clauses 1-13; or the method of any one of clauses 14-20.

Clause 22. A system comprising a terminal configured to perform:

the method of any one of clauses 1-13; or the method of any one of clauses 14-20 and a satellite configured to transmit a signal.

Clause 23. A computer-readable medium storing instructions that, when executed, cause performance of:

the method of any one of clauses 1-13; or the method of any one of clauses 14-20.

Clause 24. The method of any one of clauses 1-4, further comprising, after the receiving the signal from the NGSO satellite and before the transmitting, establishing, by the terminal, a data link with the NGSO satellite.

Clause 25. The method of clause 24, wherein the transmitting the at least part of the information to the NGSO satellite is via the data link.

Clause 26. The method of any one of clauses 24 or 25, wherein the signal from the NGSO satellite comprises a beacon signal of the NGSO satellite.

Clause 27. The method of any one of clauses 24-26, further comprising listening, by the terminal and via the second communication interface, for the signal from the NGSO satellite.

Clause 28. The method of any one of clauses 24-27, wherein: the second communication interface comprises an antenna coupled to the terminal, the antenna comprises multiple apertures, and the listening comprises scanning through the multiple apertures.

Clause 29. The method of any one of clauses 24-28, wherein the scanning through the multiple apertures comprises listening for the signal from the NGSO satellite through each aperture of the multiple apertures for a predetermined period.

Clause 30. The method of any one of clauses 24-29, wherein the information is associated with one or more Internet of Things (IoT) applications.

Clause 31. The method of any one of clauses 24-29, wherein the information is associated with one or more sensor monitoring applications.

Clause 32. The method of any one of clauses 24-31, wherein the second communication interface comprises an antenna coupled to the terminal and the antenna comprises a non-tracking antenna.

Clause 33. The method of any one of clauses 24-32, further comprising receiving, by the terminal and from the NGSO satellite, an acknowledgement that the at least part of the information has been correctly received by the NGSO satellite.

Clause 34. The method of any one of clauses 24-33, further comprising, after the receiving the acknowledgement, erasing the at least part of the information from a memory of the terminal.

Clause 35. The method of any one of clauses 24, 25, or 27-34, wherein the signal from the NGSO satellite comprises a relayed version of a signal generated by an earth station other than the terminal.

Clause 36. The method of any one of clauses 24-35, wherein the one or more devices are connected to a modem of the terminal via the first communication interface.

Clause 37. The method of any one of clauses 24-36, wherein the first communication interface comprises an Ethernet LAN interface.

Clause 38. The method of any one of clauses 24-37, wherein the second communication interface comprises an antenna coupled to the terminal and the antenna comprises a plurality of antenna panels forming a frustum.

Clause 39. The method of any one of clauses 24-38, wherein each antenna panel is configured as a transceiver aperture to communicate with the NGSO satellite.

Clause 40. A computing device comprising: one or more processors; and memory storing instructions that, when executed by the one or more processors, cause the computing device to perform the method of any one of clauses 24-39.

Clause 41. A system comprising: a terminal configured to perform the method of any one of clauses 24-39; a device configured to transmit information; and a non-geosynchronous orbit (NGSO) satellite configured to transmit a signal.

Clause 42. A computer-readable medium storing instructions that, when executed, cause performance of the method of any one of clauses 24-39.

Clause 43. The method of clause 18, wherein any of the plurality of side-faces are configured to transmit to or receive from the satellite during a single pass of the satellite orbiting the Earth.

Clause 44. The method of clause 43, wherein the data is associated with one or more sensor monitoring applications.

Clause 45. A computing device comprising: one or more processors; and memory storing instructions that, when executed by the one or more processors, cause the computing device to perform the method of any one of clauses 43 or 44.

Clause 46. A system comprising: a terminal configured to perform the method of any one of clauses 43 or 44; a device configured to transmit data; and a satellite configured to transmit a signal.

Clause 47. A computer-readable medium storing instructions that, when executed, cause performance of the method of any one of clauses 43 or 44.

Clause 48. The method of clause 1, wherein the information associated with one or more applications is generated by one or more devices coupled to the terminal via the first communication interface.

Clause 49. The method of any one of clauses 1 or 48, wherein at least one of the one or more applications comprises an Internet of Things (IoT) application.

Clause 50. The method of any one of clauses 1, 48, or 49, wherein the second communication interface comprises an antenna coupled to the terminal and the antenna comprises a plurality of antenna panels.

Clause 51. The method of any one of clauses 1 or 48-50, wherein at least a pair of the plurality of antenna panels are configured to bidirectionally communicate with the NGSO satellite.

Clause 52. A computing device comprising: one or more processors; and memory storing instructions that, when executed by the one or more processors, cause the computing device to perform the method of any one of clauses 48-51.

Clause 53. A system comprising: a terminal configured to perform the method of any one of clauses 48-51; a sensor device configured to transmit information; and a non-geosynchronous orbit (NGSO) satellite configured to transmit a signal.

Clause 54. A computer-readable medium storing instructions that, when executed, cause performance of the method of any one of clauses 48-51.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method, comprising:

receiving, by a terminal and via a first communication interface, information associated with one or more applications;

listening, by the terminal and via a second communication interface different from the first communication interface, for a signal from a non-geosynchronous orbit (NGSO) satellite, wherein the second communication interface comprises a non-tracking antenna;

receiving, by the terminal and via the second communication interface, the signal from the NGSOLD satellite;

establishing, by the terminal and responsive to the receiving the signal from the NGSO satellite, a data link with the NGSO satellite; and transmitting, by the terminal and via the data link, at least part of the information.

2. The method of claim 1, further comprising storing, in a memory of the terminal, the information.

3. The method of claim 1, wherein the transmitting the at least part of the information to the NGSO satellite is via the data link during a communication opportunity interval.

4. The method of claim 1, wherein the signal from the NGSO satellite comprises a beacon signal of the NGSO satellite.

5. The method of claim 1, wherein:

the non-tracking antenna comprises multiple apertures, and the listening comprises scanning through the multiple apertures.

6. The method of claim 5, wherein the scanning through the multiple apertures comprises listening for the signal from the NGSO satellite through any aperture of the multiple apertures for a predetermined period.

7. The method of claim 1, wherein the information is associated with one or more Internet of Things (IoT) applications.

8. The method of claim 1, wherein the information is associated with one or more sensor monitoring applications.

9. The method of claim 1, further comprising:

receiving, by the terminal and from the NGSO satellite, an acknowledgement that the at least part of the information has been correctly received by the NGSO satellite; and after the receiving the acknowledgement, erasing the at least part of the information from a memory of the terminal.

10. The method of claim 1, wherein the signal from the NGSO satellite comprises a relayed version of a signal generated by an earth station other than the terminal.

11. The method of claim 1, wherein the information associated with the one or more applications is received from one or more devices, and the one or more devices are connected to a modem of the terminal via the first communication interface; and wherein the first communication interface comprises an Ethernet LAN interface.

12. The method of claim 1, wherein the non-tracking antenna comprises a plurality of antenna panels forming a frustum, wherein each antenna panel is configured as a transceiver aperture to communicate with the NGSO satellite.

13. A method, comprising:

receiving, by a terminal and via a first communication interface, data from one or more applications;

listening, by the terminal and via a second communication interface different from the first communication interface, for a signal from a satellite, wherein the second communication interface comprises a non-tracking antenna;

receiving, by the terminal and via the second communication interface, the signal from the satellite;

establishing, by the terminal and responsive to receiving the signal from the satellite, a data link with the satellite; and transmitting, by the terminal and via the data link, at least part of the data.

14. The method of claim 13, wherein the satellite is associated with a non-geosynchronous orbit (NGSO) constellation of satellites.

15. The method of claim 13, wherein the non-tracking antenna comprises a plurality of side-faces in a shape of a frustum, wherein any of the plurality of side-faces are configured to transmit to or receive from the satellite during a single pass of the satellite orbiting the Earth.

16. The method of claim 13, wherein the data is associated with one or more sensor monitoring applications.

17. A terminal, comprising:

a first communication interface configured to receive information associated with one or more applications; and a second communication interface different from the first communication interface, the second communication interface comprising a non-tracking antenna, wherein the terminal is configured to:

listen, via the second communication interface, for a signal from a non-geosynchronous orbit (NGSO) satellite;

receive, via the second communication interface, the signal from the NGSOLD satellite;

establish, responsive to receiving the signal, a data link with the NGSO satellite; and transmit, to the NGSO satellite and via the data link, at least part of the information associated with the one or more applications.

18. The terminal of claim 17, wherein at least one of the one or more applications comprises an Internet of Things (IoT) application.

19. The terminal of claim 17, wherein the non-tracking antenna comprises a plurality of antenna panels, and wherein at least a pair of the plurality of antenna panels are configured to bidirectionally communicate with the NGSO satellite.

20. The terminal of claim 17, wherein the non-tracking antenna comprises a single frustum antenna.

* * * * *